(12) United States Patent
Ohata et al.

(10) Patent No.: US 7,416,343 B2
(45) Date of Patent: Aug. 26, 2008

(54) PULLEY SUPPORT DOUBLE ROW BALL BEARING

(75) Inventors: Toshihisa Ohata, Kanagawa (JP); Hiroshi Ishiguro, Kanagawa (JP)

(73) Assignee: NSK Ltd., Tokyo (JP)

( * ) Notice: Subject to any disclaimer, the term of this patent is extended or adjusted under 35 U.S.C. 154(b) by 338 days.

(21) Appl. No.: 10/520,852

(22) PCT Filed: Jun. 30, 2003

(86) PCT No.: PCT/JP03/08314

§ 371 (c)(1),
(2), (4) Date: Sep. 6, 2005

(87) PCT Pub. No.: WO2004/007983

PCT Pub. Date: Jan. 22, 2004

(65) Prior Publication Data

US 2006/0153484 A1    Jul. 13, 2006

(30) Foreign Application Priority Data

Jul. 12, 2002   (JP)   ............................. 2002-204123

(51) Int. Cl.
*F16C 33/72* (2006.01)
*F16C 33/76* (2006.01)

(52) U.S. Cl. .................. 384/484; 384/477; 384/486

(58) Field of Classification Search ......... 384/482–486, 384/477–478, 493, 531; 277/562, 914
See application file for complete search history.

(56) References Cited

U.S. PATENT DOCUMENTS

| 5,133,609 | A | * | 7/1992 | Ishiguro | .................... 384/486 |
|---|---|---|---|---|---|
| 5,860,748 | A | * | 1/1999 | Okumura et al. | ............ 384/486 |
| 6,719,459 | B1 | * | 4/2004 | Gotoh | ........................ 384/482 |
| 7,201,685 | B2 | * | 4/2007 | Terada et al. | ................ 384/486 |
| 2005/0041899 | A1 | | 2/2005 | Ohata et al. | ................ 384/493 |
| 2005/0078896 | A1 | | 4/2005 | Ohata et al. | ................ 384/450 |

FOREIGN PATENT DOCUMENTS

| EP | 0816699 A1 | 1/1998 |
|---|---|---|
| JP | 8-326655 | 12/1996 |
| JP | 10-339329 | 12/1998 |
| JP | 11-13771 | 1/1999 |
| JP | 11-280644 | 10/1999 |
| JP | 2001-200857 | 7/2001 |

OTHER PUBLICATIONS

Japanese Patent Application No. 2002-097966, unpublished.
Japanese Patent Application No. 2002-024683, unpublished.

* cited by examiner

*Primary Examiner*—Marcus Charles
(74) *Attorney, Agent, or Firm*—Miles & Stockbridge P.C.

(57) ABSTRACT

A pulley support double row ball bearing is disclosed, which improves the seal performance of the seal rings and is able to maintain sufficient durability even under severe conditions. The ball bearing includes inner sections of the seal rings which overlap the end surfaces in an axial direction of the inner ring such that the width of the overlap in the axial direction is 30% or more than the diameter of the balls. Moreover, tip edges of first and second protrusions are formed on the inside surface of the seal lips and come in sliding contact with end surfaces of the inner ring. Furthermore, third protrusions come close to and face the corner sections of the inner ring to form labyrinth seals in those areas.

4 Claims, 6 Drawing Sheets

PULLEY SUPPORT DOUBLE ROW BALL BEARING

TECHNICAL FIELD

The pulley support double row ball bearing according to the present invention, for example, is built into automotive auxiliary equipment such as a compressor constituting an automotive interior air conditioning apparatus, and is used for rotatably supporting a pulley for rotationally driving the automotive auxiliary equipment with respect to a fixed support member such as a housing.

BACKGROUND ART

For example, as a compressor for compressing refrigerant, which is built into a vapor compression type refrigerator built into an automotive air conditioning apparatus, conventionally several types of mechanism are known. For example, Japanese Unexamined Patent Publication No. H 11-280644 discloses a swash-plate type compressor which converts rotational motion of a rotation shaft into reciprocating motion of a piston using a swash-plate, and performs compression of refrigerant by this piston. FIG. 6 and FIG. 7 illustrate one example of such a conventionally known swash-plate type compressor.

A casing 2, constituting a compressor 1, is formed by sandwiching a central main body 3 between a head case 4 and a swash-plate case 5 from both sides in the axial direction (left-right direction in FIG. 6), and then joining these with a plurality of fastening bolts (not shown). On the inside of the head case 4, there is provided a low pressure chamber 6 and a high pressure chamber 7. Also, between the main body 3 and the head case 4, a tabular partition plate 8 is sandwiched. The low pressure chamber 6, which is shown in FIG. 6 as if divided into a plurality of sections, has the sections communicating with each other and connected to a single inlet port 9 (FIG. 7) provided on the outside surface of the head case 4. Furthermore, the high pressure chamber 7 is connected to an outlet port (not shown) also provided on the head case 4. Moreover, the inlet port 9 is connected to the outlet of an evaporator (not shown) constituting this vapor compression type refrigerator, and the outlet port is connected to the inlet of a condenser (not shown) constituting this vapor compression type refrigerator.

Within the casing 2, a rotation shaft 10 in a state of spanning between the main body 3 and the swash-plate case 5, is freely supported for rotation alone. That is to say, both ends of the rotation shaft 10 are supported by a pair of radial needle bearings 11a and 11b, on the main body 3 and the swash-plate case 5, and the thrust load exerted on this rotation shaft 10 is freely supported by a pair of thrust needle bearings 12a and 12b. Of the pair of thrust needle bearings 12a and 12b, one (right hand side in FIG. 6) thrust needle bearing 12a is provided between a part of the main body 3 and a step portion 13 formed on one end (right end in FIG. 6) of the rotation shaft 10, via a disc spring 14. Also, the other thrust needle bearing 12b is provided between a thrust plate 15 externally fitted to the outer circumferential surface of an intermediate part of the rotation shaft 10 and the swash-plate case 5.

Moreover, on the inside of the main body 3 constituting the casing 2 surrounding the rotation shaft 10, is formed a plurality (for example in the example shown on the figure, there are six evenly spaced in the circumferential direction) of cylindrical bores 16. Inside the plurality of cylindrical bores 16 formed in such a way on the main body 3, a sliding portion 18 provided at the tip half portion (right half of FIG. 6) of the respective pistons 17 is fitted to allow free displacement in the axial direction. Moreover, the space between the bottom face of the cylindrical bore 16 and the tip end surface of the piston 17 (right end surface in FIG. 6) serves as a compression chamber 19.

Furthermore, the space which exists on the inside of the swash-plate case 5 serves as a swash-plate chamber 20. On the outer circumferential surface of the intermediate part of the rotation shaft 10 located within this swash-plate chamber 20, a swash-plate 21 is fixed with a predetermined inclination angle with respect to the rotation shaft 10 such that this swash-plate rotates together with the rotation shaft 10. A plurality of locations in the circumferential direction of the swash-plate 21 and each of the pistons 17 are individually linked by means of a pair each of sliding shoes 22. Therefore, internal surfaces (mutually facing surfaces) of these individual sliding shoes 22 are made smooth faces, and are slidingly contacted with a part near the outer diameter on both side faces of the swash-plate 21 which are similarly smooth faces. On the other hand, on the base end portion of the respective portions 17 (the end portion farther from the partition plate 8; the left end portion in FIG. 6), is formed integral with each of the pistons 17, a connection portion 23 which together with the sliding shoes 22 and the swash-plate 21 constitutes a driving force transfer mechanism. Moreover, a holding portion 24 for holding the pair of sliding shoes 22 is formed on the respective connecting portions 17.

The outside end surface of each of the connecting portions 23, by means of a guide surface (not shown in the figure), is allowed free displacement only in the axial direction (left-right direction in FIG. 6) of the piston 17. Therefore, each of the pistons 17 is also fitted within the cylindrical bore 16 in such a way as to allow displacement only in the axial direction (rotation is not possible). As a result, each of the connecting portions 23 pushes and pulls each of the pistons 17 in the axial direction in accordance with the oscillating reciprocal displacement of the swash-plate 21 due to the rotation of the rotation shaft 10, and reciprocates each of the sliding portions 18 within the cylindrical bore 16 in the axial direction.

On the other hand, in the partition plate 8, which is sandwiched at the contact portion between the main body 3 and the head case 4, for partitioning the low pressure chamber 6, the high pressure chamber 7 and each of the cylindrical bores 16, is formed penetrating in the axial direction, an inlet 25 for communicating between the low pressure chamber and each cylindrical bore 16, and an outlet for communicating between the high pressure chamber 7 and each cylindrical bore 16. Also, in the part of each of the cylindrical bores 16 which faces one end of each of the inlets 25, is provided a reed valve type inlet valve 27, which allows only flow of refrigerant vapor from the low pressure chamber 6 to each of the cylindrical bores 16. Also, in the part of the high pressure chamber 7 which faces the opening on the other end (right side in FIG. 6) of the outlet 26, is provided a reed valve type outlet valve 28, which allows only flow of refrigerant vapor from the cylindrical bore 16 to the high pressure chamber 7. In this outlet valve 28, a stopper 29, which restricts displacement in the direction away from each of the outlet valve 26, is attached.

The rotation shaft 10 of the compressor 1 constructed in the above manner is driven by the propulsion engine of an automobile. Therefore, in the case of the example shown in the figure, on the periphery of a support member, in other words a support cylinder 30, provided at the center of the outside surface (left side surface in FIG. 6) of the swash-plate case 5 constituting the casing 2, is rotationally supported a driven pulley 31, by means of a double-row bearing. This driven pulley 31 is constructed in an overall annular form with a C-shaped cross section, and a solenoid 33, which is fixed to the outside surface of the swash-plate case 5, is provided within an internal cavity of the driven pulley 31.

On the other hand, at an end portion of the rotation shaft, which protrudes from the support cylinder 30, is fixed a mounting bracket 34, and around the circumferential surface of this mounting bracket 34, is supported an annular plate of magnetic material, via a plate spring 36. This annular plate 35, when there is no current through the solenoid 33, is separated from the driven pulley 31 due to the elasticity of the plate spring 36, as shown in FIG. 6. However, when there is a current through the solenoid 33, it is attracted towards this driven pulley 31, and hence allows the transmission of torque from this driven pulley 31 to the rotation shaft 10. That is to say, the solenoid 33, the annular plate 35 and the plate spring 36, constitute an electromagnetic clutch 37 for connecting and disconnecting the driven pulley 31 and the rotation shaft 10. Also, between the driving pulley fixed to the end of the crank shaft of the propulsion engine and the driven pulley 31, is spanned an endless belt 38. Furthermore, in a state where the driven pulley 31 and the rotation shaft 10 are connected by the electromagnetic clutch 37, the rotation shaft 10 is rotated based on the rotation of the endless belt 38.

The operation of the swash-plate type compressor 1 formed in the above manner is as follows. That is to say, in order to perform cooling and dehumidification of the automobile interior, in the case of operating a vapor compression type refrigerator, the rotation shaft 10 is rotated by the propulsion engine, being the driving source. As a result, the swash-plate 21 rotates, and the sliding portions 18 constituting the multiple pistons 17 reciprocate within the respective cylindrical bores 16. Furthermore, in accordance with such reciprocation of the sliding portions 18, the refrigerant vapor sucked in from the inlet port 9 is sucked from the low pressure chamber 6 through each inlet 25 into the compression chambers 19. This refrigerant vapor, after being compressed inside each of the compression chambers 19, is sent out to the high pressure chamber 7 via the outlets 26, and discharged from the outlet port.

The compressor shown in FIG. 6 is one in which the inclination angle of the swash-plate with respect to the rotation shaft is unchangeable, and hence the refrigerant discharge volume is fixed. On the other hand, a variable displacement swash-plate type compressor in which the inclination angle of the swash-plate with respect to the rotation shaft can be changed in order to change the discharge volume in accordance with cooling load and the like, is conventionally widely known from, for example, the disclosure of Japanese Unexamined Patent Publication No. H 8-326655 and so on, and is commonly implemented. Moreover, as a compressor for a vapor compression type refrigerator constituting an automobile air conditioning apparatus, the use of a scroll type compressor is also being researched in some places. Furthermore, in relation to a conventional compressor in which a piston is reciprocated by means of a ball joint, this is still also being used in some places.

Whichever the structure of the compressor used, the compressor constituting the automobile air conditioning apparatus is driven by the endless belt spanning between the driving pulley fixed to the end of the crank shaft of the propulsion engine and the driven pulley provided on the compressor side. Therefore, a radial load based on the tension force of the endless belt, is exerted on the bearing which rotatably supports the driven pulley. In order to perform reliable power transmission without slippage, between the endless belt and each of the pulleys, the tension force on the endless belt, in other words, the radial load, becomes correspondingly large. Therefore, as a bearing for supporting the driven pulley, in order to support this large radial load, it is necessary to use one with sufficient load capacity.

When the double row ball bearing 32 incorporated in the conventional structure shown in FIG. 6 is viewed from this perspective, the spacing D of balls 39 arranged in a double row is large, and hence the structure is said to be one which can ensure sufficient load capacity. However, with the double row ball bearing 32, the dimensions in the axial direction becomes bulky. On the other hand, recently, in consideration of the global environment, in an attempt to improve fuel efficiency of automobiles, miniaturization and lightening of automobile auxiliary equipment such as the compressor is demanded. Furthermore, a demand has also arisen for shortening of the axial dimensions of rolling bearings for supporting driven pulleys incorporated into automobile auxiliary equipment.

In response to such demands, as a rolling bearing for supporting the driven pulley, the use of single row deep groove ball bearings and three point or four point contact type ball bearings is being researched. However, with such ball bearings, rigidity with respect to the load, mainly the moment load, exerted on the driven pulley, cannot be easily ensured, and it is difficult to ensure a sufficient low-vibration property (propensity for not vibrating) or durability. That is to say, there are occasions where, though slight in magnitude, the moment load from the driven pulley acts on the rolling bearing. However, rigidity of the single row deep groove type ball bearing with respect to the moment load is low. Also, regarding the three point to four point contact type ball bearing, though rigidity with respect to the moment load is higher than the ordinary single row deep groove type ball bearing, there are occasions where the rigidity is not always sufficient due to the relationships such as the magnitude of the tension force on the endless belt or the arrangement (eccentricity between the direction of radial load and the location of the ball bearing center). As a result, vibration as well as noise during the operation becomes more likely, and it is difficult to ensure durability.

The pulley support double row ball bearing of the present invention was invented in consideration of such circumstances.

RELATED ART

With such circumstances in mind, the present inventor first thought of ensuring the required rigidity by reducing the diameter of the balls and reducing the spacing between the balls arranged in double rows, as well as supporting the driven pulley using a double row ball bearing with reduced dimensions related to the axial direction (Japanese Patent Application No. 2002-24863, Japanese Patent Application No. 2002-97966). In the case of a pulley supporting double row ball bearing according to these related inventions, one having an outer ring with an outer diameter of less than 65 mm and a double row of outer ring raceways on the inner circumferential surface is used. Also, an inner ring having a double row of inner ring raceways on the outer circumferential surface is used. Moreover, balls with a diameter (major diameter) of less than 4 mm are used, and several of these are provided so as to roll freely between each of the outer ring raceways and each of the inner ring raceways. Also, by using a retainer, each of the balls are held so as to allow free rolling. Moreover, a pair of seal rings is used to seal off the openings on both sides of the inner space accommodating each of the balls between the inner circumferential surface of the outer ring and the outer circumferential surface of the inner ring. Furthermore, the spacing between the balls, and the spacing between the balls and the seal ring are reduced, thus providing a double row ball bearing with an overall width in the axial direction (approximately coinciding with the outer ring width and inner ring width) of less than 45% of the inner diameter of this inner ring.

Also, in order to reduce the spacing between the balls, a crown shaped retainer made of synthetic resin is used for each of the retainers, and rims of each of the retainers are provided to oppose each other from opposite sides (i.e. outsides in the axial direction, and sides opposed to the seal ring). Also, the distance between the rim of each of the retainers and the inside surface of the seal ring is reduced. However, again in this case, the distance between the rim of each of the retainers and the inside surface of each seal ring is ensured to be over 13% of the diameter of each of the balls such that the filling amount of the grease within the inner space accommodating each of the balls, between both of the seal rings can be ensured.

According to the pulley support double row ball bearing associated with the related invention, moment rigidity is ensured, while the width related to the axial direction is reduced, and it is possible to contribute to the realization of small and light automobile auxiliary equipment, which produces low noise during operation.

DISCLOSURE OF THE INVENTION

Any of the pulley support double row ball bearings according to the present invention, in a similar manner to the aforementioned pulley support double row ball bearing associated with the related invention, is provided with: an outer ring with an outer diameter of less than 65 mm and having a double row outer ring raceway on an inner circumferential surface; an inner ring having a double row inner ring raceway on an outer circumferential surface; balls with a diameter of less than 4 mm, provided as several balls so as to be free rolling between the outer ring raceways and the inner raceways; a retainer which holds these balls so as to be free rolling; and a seal ring, which exists between the inner circumferential surface of the outer ring and the outer circumferential surface of the inner ring, and seals off openings on both ends of an inner space accommodating the balls. Furthermore, a width of the bearing related to the axial direction is less than 45% of the inner diameter of the inner ring, and by externally fitting this inner ring to a support member and internally fitting the outer ring to a pulley, the pulley is rotatably supported on the periphery of this support member.

Particularly, in a first aspect of the pulley support double row ball bearing of this invention, a portion near an inner circumference of the respective seal rings and both end surfaces in the axial direction of the inner ring overlap when viewed from the axial direction, so that a width in the radial direction of an overlap section is 25% or more than a diameter of the respective balls. Also, a plurality of protrusions are formed all around a circumference on an inside surface at a portion near an inner circumference of the respective seal rings, and a tip edge of at least one of the protrusions comes in sliding contact with the end surfaces in the axial direction of the inner ring.

Moreover, in a second aspect of the pulley support double row ball bearing of this invention, a portion near an inner circumference of the respective seal rings and both end surfaces in the axial direction of the inner ring overlap when viewed from the axial direction, so that a width in the radial direction of an overlap section is 25% or more than a diameter of the respective balls. Also, one or more protrusions are formed all around a circumference on a side surface at a portion near an inner circumference of the respective seal rings, and a tip edge of at least one of the protrusions comes in sliding contact all the way around the circumference with a part of the surface of the inner ring. Together with this, another portion near the inner circumference of the respective seal rings, not being a protusion in sliding contact, comes close to and faces the other part of the surface of the inner ring, so that labyrinth seals are formed.

In a third aspect of the double row ball bearing for pulley support of this invention, the seal rings comprise an elastic material having a Shore hardness of 60 to 80 and reinforced by a metal core. The width in the radial direction of a deformed section of the elastic material that protrudes inward in the radial direction from the inner edge of the metal core is 40% or more than the diameter of the respective balls, and the thickness of the thinnest area of this deformed section, which is located in the middle in the radial direction, is 0.4 mm or more.

In a fourth aspect of the double row ball bearing for pulley support of this invention, the seal rings comprise an elastic material that is reinforced by a metal core. Also, an inner diameter of this metal core is less than an outer diameter of the inner ring.

Furthermore, in a fifth aspect of the double row ball bearing for pulley support of this invention, the seal rings comprise an elastic material that is reinforced by a metal core. Also, a position in the axial direction of the center of gravity of the deformed section of the elastic material that protrudes inward in the radial direction from the inner edge of the metal core is located more adjacent to the side of the sliding contact between the tip edge of the seal ring and part of the surface of the inner ring than the position of the center of deformation of this deformed section.

In the embodiments of this invention, the aforementioned aspects can be embodied singly or in appropriate combinations. It is also possible to combine all of the aspects described above.

In the case of the double row ball bearing for pulley support of this invention constructed as described above, the seal rings make a good seal at the openings on both ends, and it is possible to maintain excellent durability even under severe conditions.

First, in the case of the double row ball bearing for pulley support of the first and second aspects, it is possible to maintain the width in the axial direction of the overlap sections of the inner edge sections of the seal rings and the end surfaces in the axial direction of the inner ring, and since there is a plurality of protrusions in this overlap section (in the case of the first aspect), or protrusions and labyrinth seals (in the case of the second aspect), it is possible to have a good seal in the overlap sections.

Moreover, in the case of the double row ball bearing for pulley support of the third and fourth aspects, it is possible to maintain the rigidity of the elastic material of the seal rings, as well as maintain the surface pressure at the areas of sliding contact between the tip edges of this elastic material and parts of the surface of the inner ring, therefore it is possible for the seal rings to make a good seal.

Furthermore, in the case of the double row ball bearing for pulley support of the fifth aspect, the centrifugal force that acts on the seal lips during operation acts in a direction that pushes the seal lips formed on the tip edges of the seal rings toward parts of the surface of the inner ring. As a result, it is possible to maintain the surface pressure at the areas of sliding contact between the tip edges of this elastic material and

DESCRIPTION OF THE PREFERRED EMBODIMENTS

Figure 1:
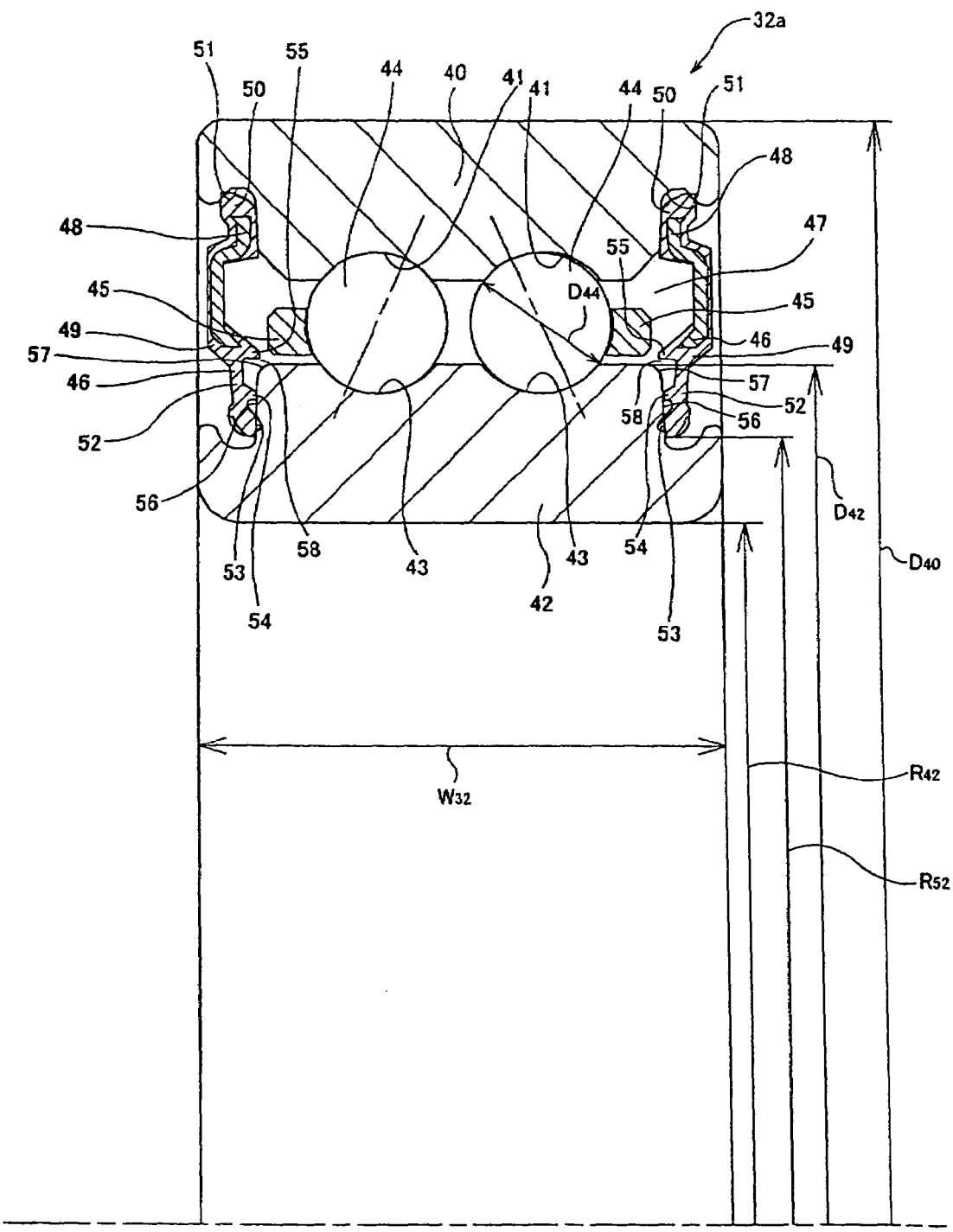
FIG. 1 is a cross-sectional view that shows a first example of an embodiment of the invention.
Figure 2:
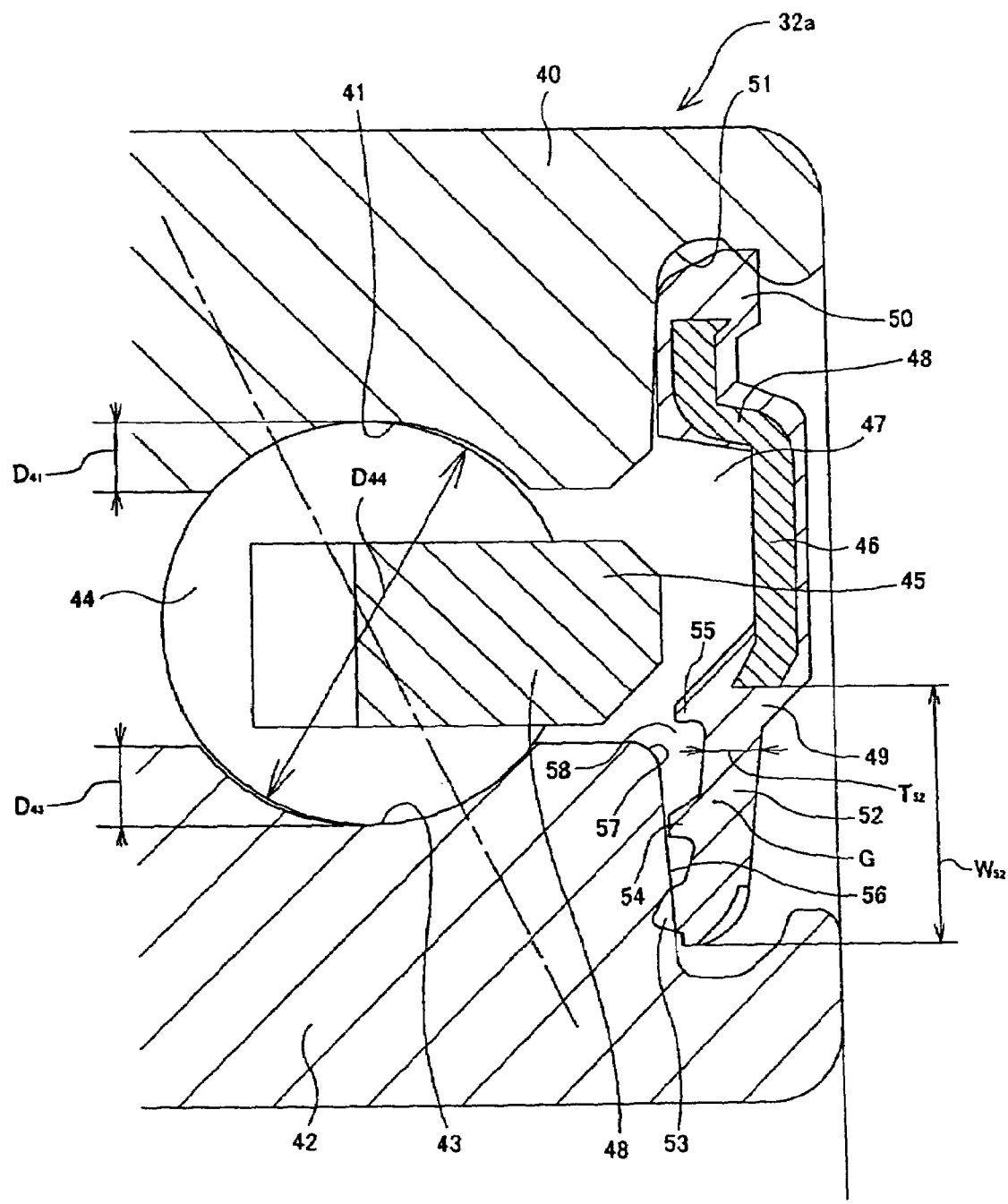
FIG. 2 is an enlarged view of the upper right area in FIG. 1.

FIGS. 1 to 2 show a first embodiment of the invention and correspond to a first, second, third and fifth aspect of the invention. In FIG. 1 and FIG. 2, (and FIG. 3 to be described later) the proportions of the dimensions of each of the parts are drawn based on the actual proportions. In the case of the pulley support double row ball bearing 32a of this embodiment, an outer race with an outer diameter $D_{40}$ (see FIG. 1) of 65 mm or less ($D_{40} \leq 65$ mm) and having double rows of outer raceways 41 formed around its inner circumferential surface is used as the outer ring 40. Also an inner ring having double rows of inner raceways 43 formed around its outer circumferential surface is used as the inner ring 42. Moreover, balls 44 having a diameter (outer diameter) $D_{44}$ (see FIG. 1 and 2) of 4 mm or less ($D_{44} \leq 4$ mm) are used (for all practical purposes, the balls used are 3 to 4 mm), and a plurality of balls is located between each of the outer raceways 41 and inner raceways 43 such that they can roll freely. Also, a pair of retainers 45 holds the balls 44 such that they can roll freely, and a pair of seal rings 46 covers the opening on both ends of the internal space between the inner circumferential surface of the outer ring 40 and the outer circumferential surface of the inner ring 42 where the balls 44 are located. The width $W_{32}$ of the double row ball bearing 32a (FIG. 1) is 45% or less than the inner diameter $R_{42}$ (FIG. 1) of the inner ring 42 ($W_{32} \leq 0.45 R_{42}$).

Throughout all of the drawings the same reference numbers will be used for the same components.

Each of the seal rings 46 comprises a circular-shaped metal core 48 that is made of metal such as steel sheet and is reinforced by an elastic material 49 such as nitrile rubber, heat-resistant nitrile rubber, acrylic rubber or fluororubber, and it has a complete circular shape. Also, an elastic material having a Shore hardness (HS) within the range 60 to 80 is used as this elastic material 49. Moreover, the outer edge of this elastic material 49 has an attachment section 50 that protrudes outward in the radial direction further than the outer edge of the metal core 48, and this attachment section 50 is attached to an attachment groove 51 that is formed around the inner circumferential surface on both ends of the outer ring 40. Also, the inner half in the radial direction of this elastic material 49 protrudes inward in the radial direction further than the metal core 48 and functions as a seal lip 52.

In the case of this embodiment, when viewed from the axial direction, this seal lip 52 overlaps the inner ring 42 by an amount that is 25% or more than the diameter $D_{44}$ of the balls 44. In other words, when the inner diameter of the seal lip 52 is taken to be $R_{52}$ (FIG. 1) and the outer diameter of the inner ring 42 is taken to be $D_{42}$ (FIG. 1), the inside surface of the seal lip 52 and the surface on both ends in the axial direction of the inner ring 42 face each other in the ring-shaped area such that the width in the radial direction is ½ the difference between the outer diameter $D_{42}$ and the inner diameter $R_{52}$ $\{(D_{42}-R_{52})/2\}$. In this embodiment, the width of this ring-shaped area 25% or greater than the diameter $D_{44}$ of the balls 44 $\{(D_{42}-R_{52})/2 \geq 0.25 D_{44}\}$, and more preferably greater than 35% the diameter $D_{44}$. The maximum value for the width of this ring-shaped area is not particularly set, however, from the aspect of preventing the bearing from becoming large, it is not practical for it to be greater than the diameter $D_{44}$. In order to have a compact pulley support double row ball bearing, it is best to keep the width less than 80% and more preferably less than 70% of the diameter $D_{44}$.

On the other hand, a first to third protrusion 53 to 55 are formed in order from the inner side in the radial direction all the way around the circumference on the inside surface of the seal lip 52 such that they are concentric with each other. With the outer edge of each seal ring 46 attached to the attachment groove 51, of these protrusions 53 to 55, the tip edge of the first protrusions 53 that are located the furthest inward in the radial direction comes in sliding contact along the entire circumference with the surfaces 56 on both ends in the axial direction of the inner ring 42. On the other hand, the tip edges of the second protrusions 54 that are located in the middle and the third protrusions 55 that are located the furthest outward in the radial direction come very close to and face both end surfaces 56 or the corner sections 57 that are located in the connecting areas between the outer circumferential surface of the inner ring 42 and both end surfaces 56, to form labyrinth seals in those areas.

Moreover, the width $W_{52}$ in the radial direction of the seal lips (FIG. 2) as a deformed section in the third aspect of the invention, is taken to be 40% or more of the diameter $D_{44}$ of the balls ($W_{52} \geq 0.4 D_{44}$). Also, the thickness $T_{52}$ (FIG. 2) at the thinnest section that is located in the middle in the radial direction of the seal lip 52 (it is not necessary to be in the middle) is taken to be 0.4 mm or more ($T_{52} > 0.4$ mm). The upper limit for the thickness $T_{52}$ of this section in not particularly limited, however, the rigidity of the seal lip 52 should not be greater than necessary, and in order to keep the material costs down, it is preferred that it be 0.6 mm or less and even more preferably less than 0.5 mm. Moreover, it is preferred that the width $W_{52}$ of the seal lip be 60% or less than that of the diameter $D_{44}$, and more preferably less than 50%.

Furthermore, in this embodiment, in regards to the position in the axial direction (left-right direction in FIG. 1 and FIG. 2), the deformed sections of the elastic material 49 that protrude inward in the radial direction from the inner edges of the metal cores 48, or in other words, the position of the center of gravity G (FIG. 2) of the seal lips is located further on the side where there is sliding contact between the tip edges of the seal lips 52 (first and second protrusions 53, 54) and both end surfaces in the axial direction of the inner ring 42 than the center of deformation of the deformed sections of the seal lips 52. In other words, the shape and dimensions of each of the parts is regulated such that the seal lip 52 elastically deforms around the inner edge of the metal core 48 or the thinnest section of the seal lip 52, and when the outer edge section of each seal ring 46 is attached to the attachment groove 51, the position of the center of gravity G is located further on the side of both end surfaces 56 of the inner ring than the center of the elastic deformation.

In the case of the pulley support double row ball bearing 32a of this embodiment constructed as described above, there is good seal performance by both seal rings 46 that are located at the openings on both ends, so even when operating under severe conditions, it is possible to maintain excellent durability. In other words, in the case of the pulley support double row ball bearing 32a of this embodiment, the width in the radial direction of the overlap portions in the axial direction of the inner edges of the seal rings 46 and both end surfaces in the axial direction of the inner ring 42 is maintained. Also, the tip edges of the first and second protrusions 53, 54 located in the overlap sections come in sliding contact all along their circumference with both end sections 56, and labyrinth seals 58 are formed between the third protrusions 55 and the corner sections 57. Therefore, there is a good seal in the overlap sections.

The elastic material 49 of the seal rings 46 is made of rubber having a Shore hardness of 60 to 80, and the thickness $T_{52}$ of the middle section (the thinnest section) of the seal lip 52 that is formed on the inner diameter half of this elastic material 49 is maintained at 0.4 mm or greater, so it is possible to maintain the rigidity of the seal lip 52. As a result, it is possible to maintain surface pressure at the areas of sliding contact between the tip edges of the first and section protrusions 53, 54 that are formed on the inside surface of the seal lips 52 and both end surfaces 56 in the axial direction of the inner ring 42, and thus it is possible to make a good seal by the seal rings 46.

Furthermore, in the case of the pulley support double row ball bearing 32a of this embodiment, by properly regulating the position of the center of gravity G, the centrifugal force that is applied to the seal lips 52 of each of the seal rings 46 during operation acts in a direction such that the seal lips 52 are elastically deformed toward both end surfaces 56 of the inner ring 42. As a result, it is possible to maintain surface pressure at the areas of sliding contact between the tip edges of the first and section protrusions 53, 54 and both end surfaces 56 in the axial direction of the inner ring 42 (it is possible to prevent a drop in surface pressure during high-speed rotation), and thus it is possible to make a good seal by the seal rings 46.

It is not directly related to the invention, however, each of the outer raceways and inner raceways are deep-groove type tracks, and from the aspect of maintaining the moment rigidity of the pulley support double row ball bearing, it is preferred that the groove depth $D_{41}$ (FIG. 2) of each of the outer raceways 41 be kept at 18% or more than the diameter $D_{44}$ of the balls 44, and that the groove depth $D_{43}$ of the inner raceway 43 (FIG. 2) be kept at 20% or more than the diameter $D_{44}$ ($D_{41} \geq 0.18 D_{44}$, $D_{43} \geq 0.20 D_{44}$). However, the total depth of both grooves $D_{41}$, $D_{43}$ is kept at 42% or less than the diameter $D_{44}$ $\{(D_{41}+D_{43}) \leq 0.42 D_{44}\}$, so it is possible to install the balls 44 between both raceways 41, 43.

Figure 3:
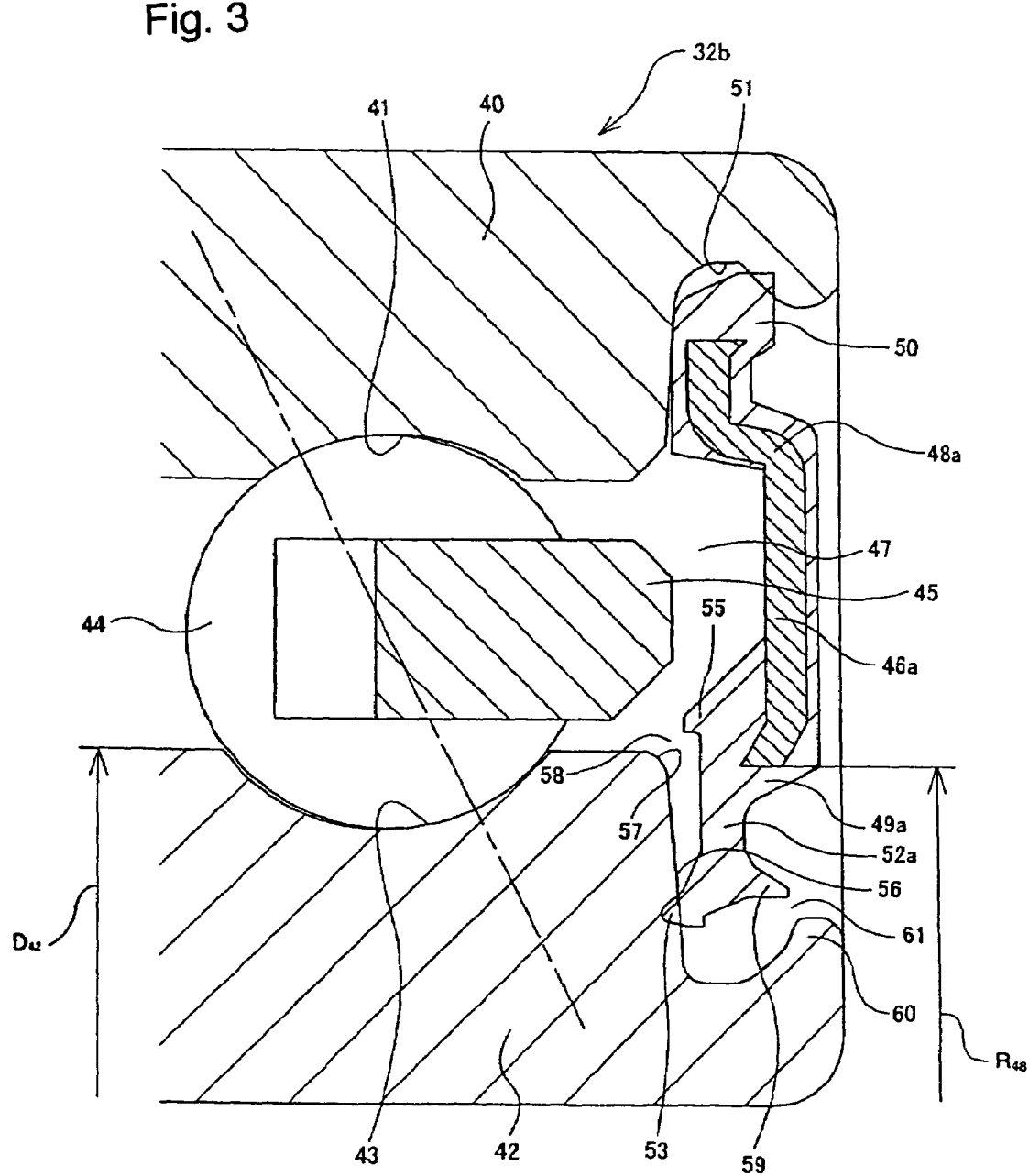
FIG. 3 is a drawing similar to FIG. 2 that shows a second example of an embodiment of the invention.

Next, FIG. 3 shows a second example of an embodiment of the invention that corresponds to a second, third, forth and fifth aspect of the invention. In the case of the double row ball bearing 32b of this embodiment, the inner diameter $R_{48}$ of the metal core 48 of the seal ring 46a is taken to be less than the outer diameter $D_{42}$ of the inner ring 42 ($R_{48} < D_{42}$). Also, only a first protrusion 53 is formed on the inner edge of the inside surface of the seal lip 52a that is formed on the inner half in the radial direction of the elastic material 49a and a third protrusion 55 is formed on the base end (the outer end in the radial direction), and the second protrusion 54 in the middle is omitted (see FIG. 1 and FIG. 2). Instead, a fourth protrusion 59 is formed around the inner edge on the outside surface of the seal lip 52a.

When the outer edges of the seal rings 46a are attached to the attachment grooves 51 that are formed around the inner circumferential surfaces on both ends of the outer ring 40, only the tip edges of the first protrusions 53 come in sliding contact all the way around their circumference with the end surfaces 56 in the axial direction of the inner ring 42. At the same time, the tip edges of the third protrusions 55 come close to and face the corner sections 57, and the fourth protrusions 59 come close to and face protrusions 60 that are formed around the outer circumferential surfaces on the ends of the inner ring 42 to form labyrinth seals 58, 61 in those areas.

In the case of the embodiment described above, by keeping the inner diameter $R_{48}$ of the metal core 48a less then the outer diameter $D_{42}$ of the inner ring 42, the rigidity of the seal lips 52a is increased, and it becomes easy to maintain surface pressure at the areas of sliding contact between the tip edges of the first protrusions 53 and the end surfaces 56 in the axial direction of the inner ring 42. Furthermore, since the areas of sliding contact are located between pairs of labyrinth seals 58, 61, it is possible to sufficiently maintain a good seal at the openings on both ends of the pulley support double row ball bearing 32b.

Figure 4:
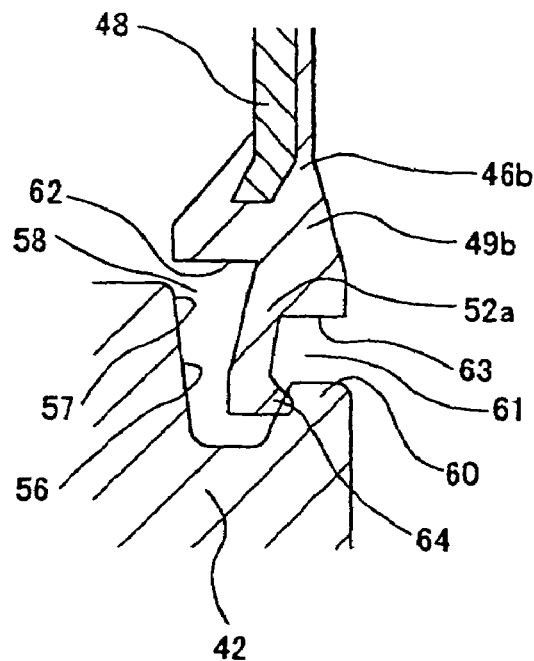
FIG. 4 is a partial cross-sectional drawing that corresponds to the lower right area of FIG. 2 and shows a third example of an embodiment of the invention.

Next, FIG. 4 shows a third embodiment of the invention that corresponds to the second and third aspects of the invention. In this embodiment, the thickness of the section of the inner half of the elastic material 49b of the seal ring 46b that protrudes inward in the radial direction further than the inner edge of the metal core 48 suddenly decreases in the middle section as it goes from the outside inward in the radial direction. Also, an inside stepped section 62 and an outside stepped section 63 are formed respectively on the inside surface and outside surface of the middle section in the radial direction. When the outer edge of the seal ring 46b is attached around the inner circumferential surface on the end of the outer ring 40 (see FIGS. 1 to 3), the inside stepped section 62 comes close to and faces the corner section 57 around the outer circumferential surface of the inner ring 42, and the outside stepped section comes close to and faces the protrusion 60 to respectively form labyrinth seals 58, 61 in those areas. The tip edge of the protrusion 64 that is formed around the inner edge of the outside surface of the seal lip 52a and that is located further inward in the radial direction than both of the stepped sections 62, 63 comes in sliding contact all the way around its circumference with the inside surface of the protrusion 60 that is part of the surface of the inner ring 42. In the case of this embodiment as well, similar to the second embodiment described above, the area of sliding contact is located between a pair of labyrinth seals 58, 61, so it is possible to sufficiently maintain a good seal at the openings on both ends of the pulley support double row ball bearing.

Figure 5:
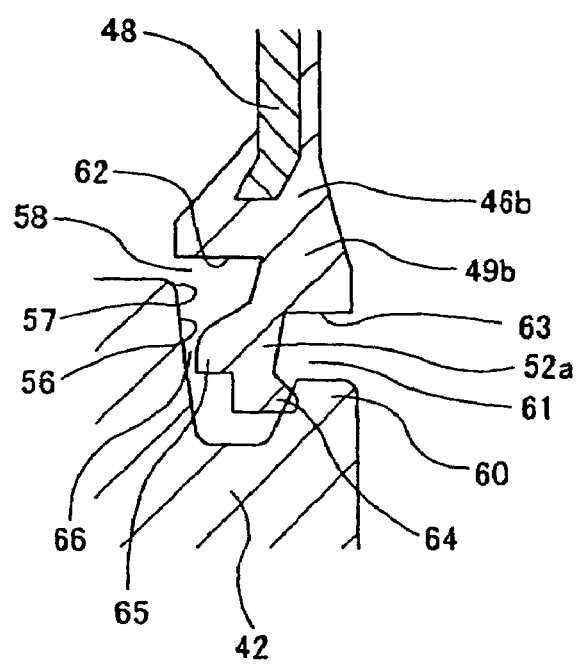
FIG. 5 is a partial cross-sectional view that corresponds to the lower right area in FIG. 2 and shows a fourth example of an embodiment of the invention.
Figure 6:
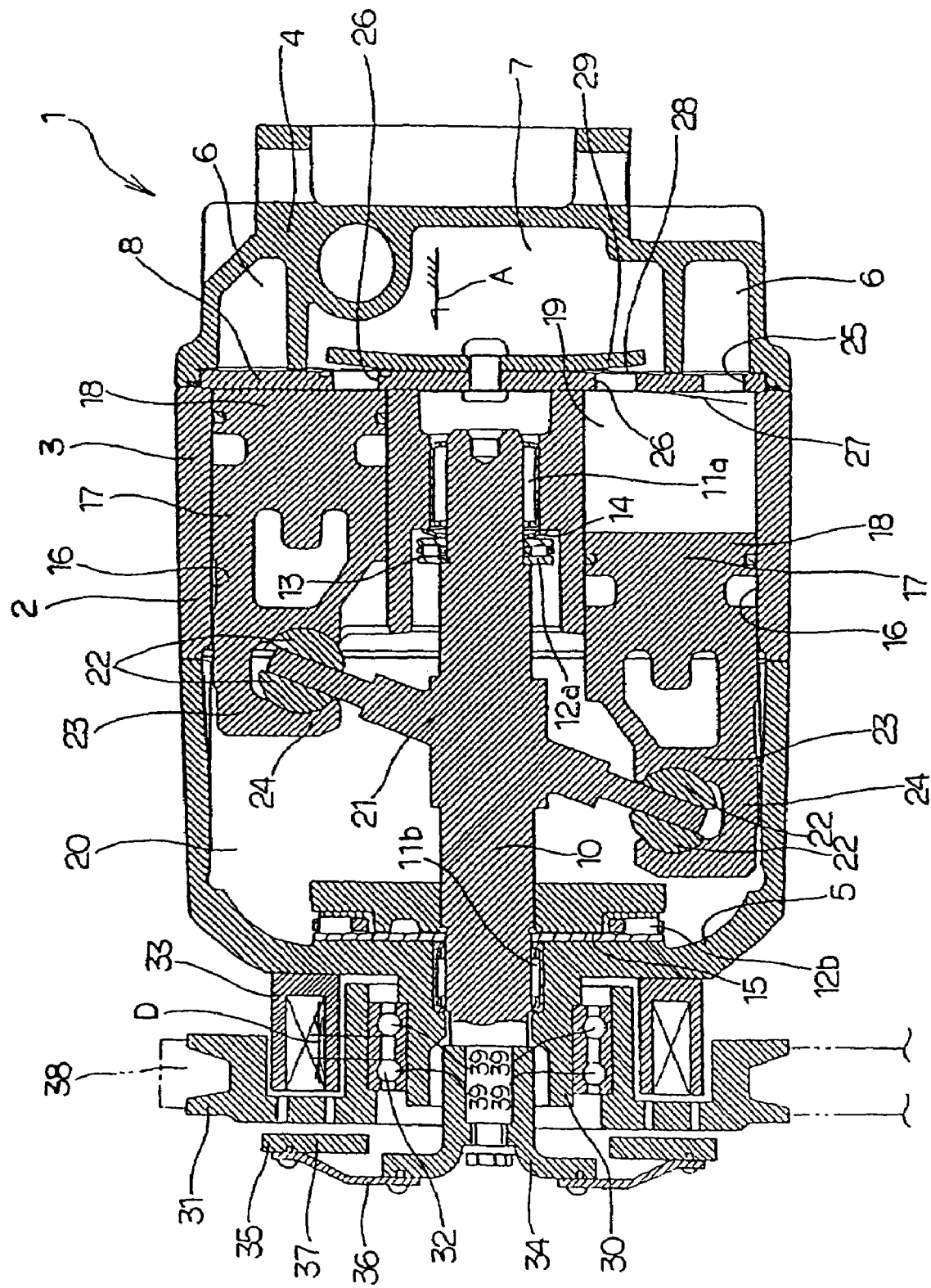
FIG. 6 is a cross-sectional view showing an example of a prior known compressor.
Figure 7:
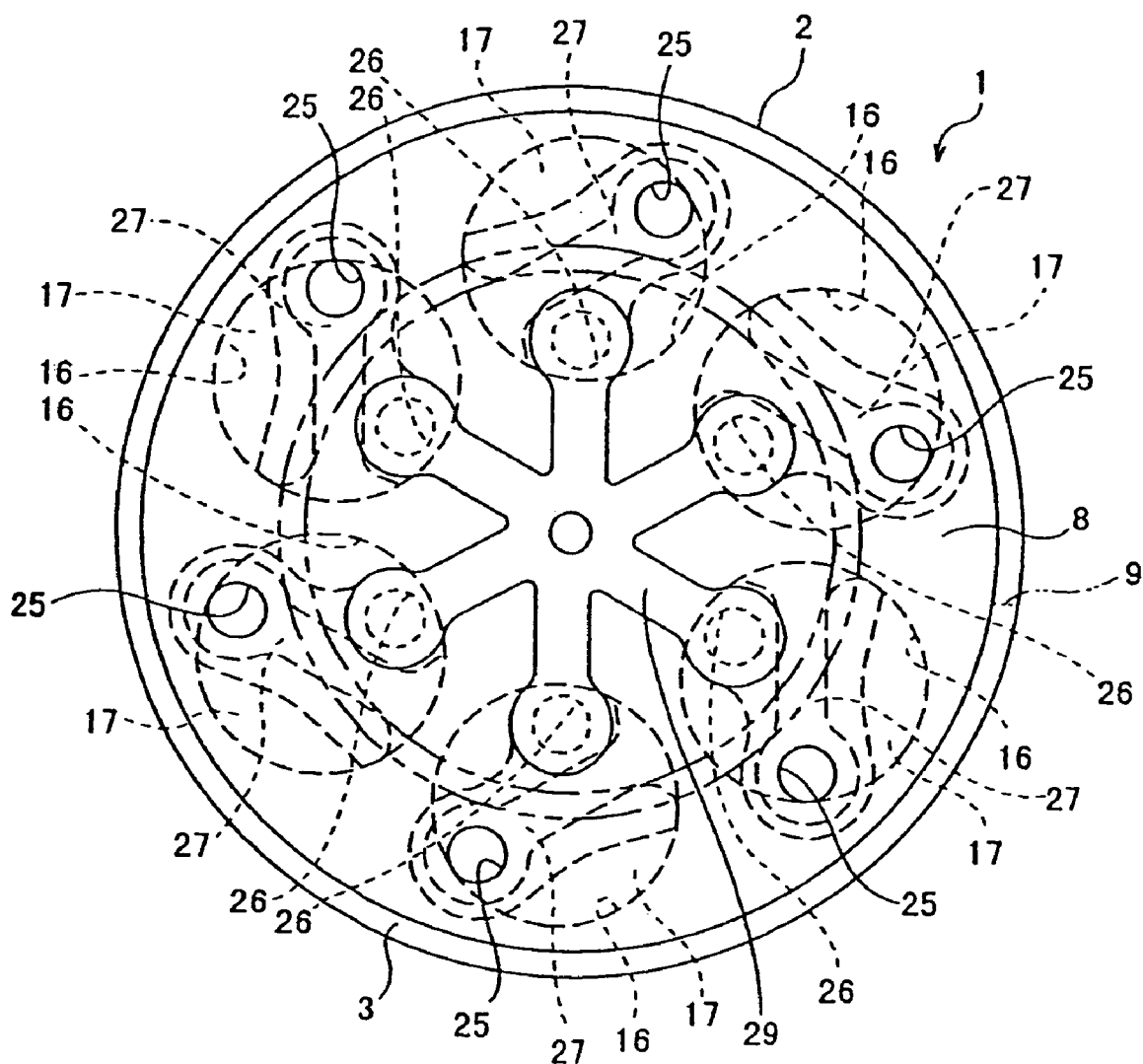
FIG. 7 is a drawing showing the view in the direction of the arrow A in FIG. 6.

Next, FIG. 5 shows a fourth embodiment of the invention that corresponds to the second and third aspects of the invention. In the case of this embodiment, the tip edge of the protrusion 65 that is formed all the way around the circumference on the inside surface of the middle section of the seal lip 52a comes close to and faces the end surface 56 in the axial direction of the inner ring 42 and forms a labyrinth seal in that area. In this embodiment, compared with the third embodiment described above, the number of labyrinth seals is increased by this labyrinth seal 66, so it is possible to further improve the seal performance at the openings on both ends of the pulley support double row ball bearing.

INDUSTRIAL APPLICABILITY

The pulley support double row ball bearing of this invention is constructed and functions as described above, so even when used under severe conditions, it is possible to effectively prevent foreign matter such as muddy water from getting inside the bearing, and it can contribute to making various auxiliary equipment of an automobile, such as a compressor, more compact and lightweight, while at the same time maintaining durability.

What is claimed is:

1. A pulley support double row ball bearing comprising:
    an outer ring having an outer diameter of 65 mm or less and a double row raceway formed on an inner circumferential surface thereof;
    an inner ring having a double rowraceway formed on an outer circumferential surface thereof;
    a plurality of balls each 4 mm or less in diameter, and each retained by a retainer between the outer and inner raceways such that they roll freely; and
    seal rings that seal openings on both ends of an internal space between the inner circumferential surface of the outer ring and the outer circumferential surface of the inner ring where the plurality of balls are disposed;
    wherein an axial width of the bearing does not exceed 45% of an inner diameter of the inner ring, and by fitting the inner ring around a support member and fitting the outer ring inside a pulley, the pulley is supported such that it rotates freely around the support member;
    and wherein a portion of each seal ring near an inner circumference thereof and a corresponding axial end surface of the inner ring overlap when viewed from the axial direction, so that a width in a radial direction of an overlap section is between 25% and 80% of a diameter of one of the plurality of balls;
    and wherein each seal ring includes a plurality of protrusions formed circumferentially on an inside surface at a portion near an inner circumference of the seal ring such that a tip edge of at least one of the plurality of protrusions comes in sliding contact with the corresponding axial end surface of the inner ring.

2. A pulley support double row ball bearing described in claim 1,
    wherein each seal ring comprises an elastic material reinforced by a metal core, and a position in an axial direction of a center of gravity of a deformed section of the elastic material that protrudes inward in a radial direction from an inner edge of the metal core is located more adjacent to a side where the tip edge of the seal ring and part of the surface of the inner ring come into sliding contact, than the position of the center of deformation of the deformed section.

3. A pulley support double row ball bearing comprising:
    an outer ring having an outer diameter of 65 mm or less and a double row raceway formed on an inner circumferential surface thereof;
    an inner ring having a double rowraceway formed on an outer circumferential surface thereof;
    a plurality of balls each 4 mm or less in diameter, and each retained by a retainer between the outer and inner raceways such that they roll freely; and
    seal rings that seal openings on both ends of an internal space between the inner circumferential surface of the outer ring and the outer circumferential surface of the inner ring where the plurality of balls are disposed;
    wherein an axial width of the bearing does not exceed 45% of an inner diameter of the inner ring, and by fitting the inner ring around a support member and fitting the outer ring inside a pulley, the pulley is supported such that it rotates freely around the support member;
    and wherein a portion of each seal ring near an inner circumference thereof and a corresponding axial end surface of the inner ring overlap when viewed from the axial direction, so that a width in a radial direction of an overlap section is between 25% and 80% of a diameter of one of the plurality of balls;
    and wherein each seal ring includes one or more protrusions formed circumferentially on an inside surface at a portion near an inner circumference such that a tip edge of at least one of the protrusions comes in sliding contact with a part of the surface of the inner ring all the way around the circumference;
    and wherein each seal ring includes portions not in sliding contact with the inner ring near the inner circumference of the respective seal rings, said portions disposed close to and facing a portion of the surface of the inner ring not in sliding contact with the protrusions, so that labyrinth seals are formed.

4. A pulley support double row ball bearing comprising:
    an outer ring having an outer diameter of 65 or less and a double row raceway formed on an inner circumferential surface thereof;
    an inner ring having a double rowraceway formed on an outer circumferential surface thereof;
    a plurality of balls each 4 mm or less in diameter, and each retained by a retainer between the outer and inner raceways such that they roll freely; and
    seal rings that seal openings on both ends of an internal space between the inner circumferential surface of the outer ring and the outer circumferential surface of the inner ring where the plurality of balls are disposed;
    wherein an axial width of the bearing does not exceed 45% of an inner diameter of the inner ring, and by fitting the inner ring around a support member and fitting the outer ring inside a pulley, the pulley is supported such that it rotates freely around the support member;
    and wherein each seal ring comprises an elastic material having a Shore hardness of 60 to 80 and reinforced by a metal core, and the width in a radial direction of a deformed section of the elastic material that protrudes inward in the radial direction from an inner edge of the metal core is 40% or more than the diameter of one of the plurality of balls, and a thickness of a thinnest area of the deformed section, which is located in a middle in the radial direction of the deformed section, is between 0.4 mm and 0.6 mm.

* * * * *